UNITED STATES PATENT OFFICE.

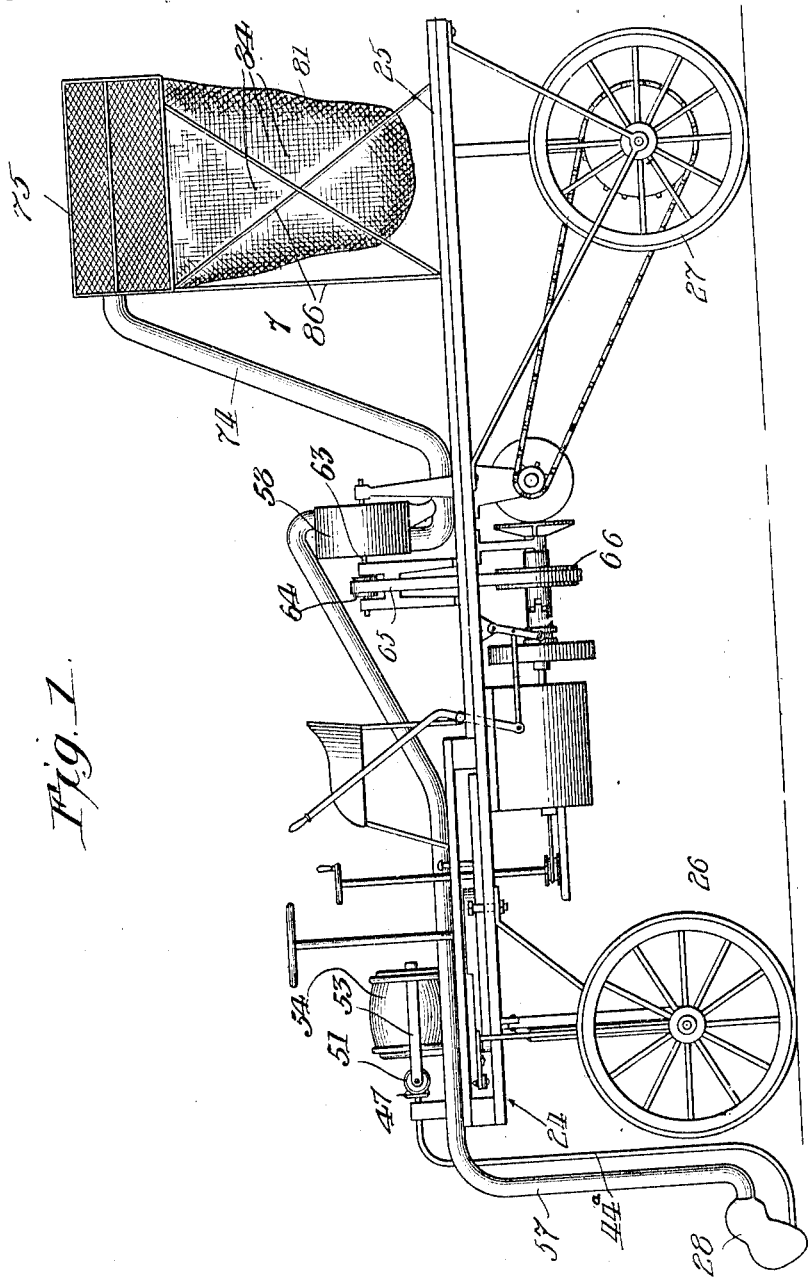

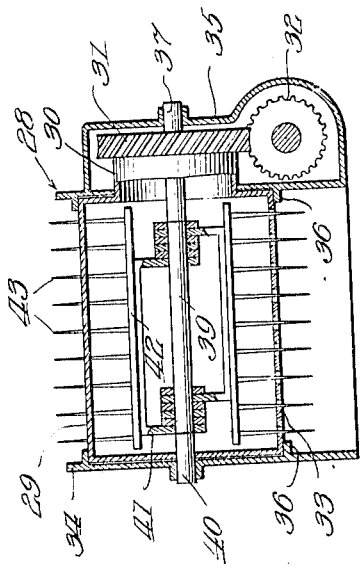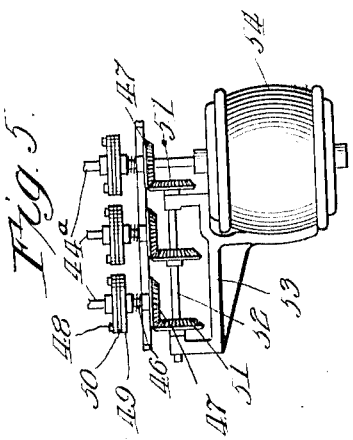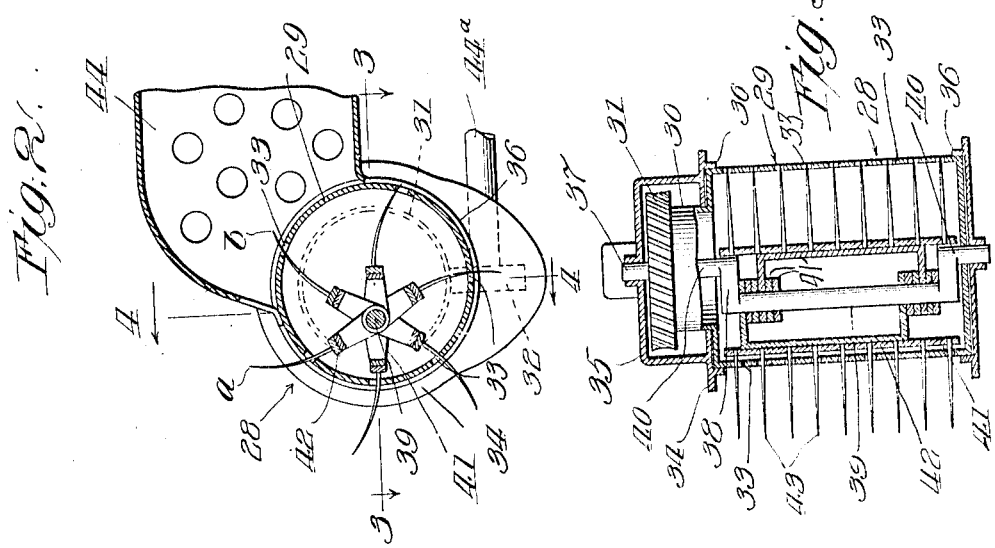

STEPHEN S. THOMAS, OF GULFPORT, MISSISSIPPI.

COTTON-PICKER.

1,107,633.

Specification of Letters Patent. Patented Aug. 18, 1914.

Application filed December 5, 1910. Serial No. 595,678.

*To all whom it may concern:*

Be it known that I, STEPHEN S. THOMAS, a citizen of the United States, residing at Gulfport, in the county of Harrison and State of Mississippi, have invented certain new and useful Improvements in Cotton-Pickers, of which the following is a specification.

The present invention relates to a machine adapted to be operated in a cotton-field for the purpose of gathering cotton from the boll and conveying it to a suitable receptacle, which in turn is transported to the gin, or other destination of the raw cotton.

The objects of the present invention are, to form the operating parts of the picker head so that they will be simple and efficient of operation and cheap of manufacture; to provide a rotatable drum as a portion of the picker head; and to utilize this drum as a stripper for removing the cotton from the picker teeth.

The invention further consists in the features of construction and combination of parts hereinafter described and claimed.

In the drawings, Figure 1 is a side elevation showing the mechanism of the present invention in place upon the truck; Fig. 2, an enlarged side elevation, partly in section, of one of the picker heads; Fig. 3, a section on line 3—3 of Fig. 2, looking in the direction of the arrow; Fig. 4, a section on line 4—4 of Fig. 2, looking in the direction of the arrow; and Fig. 5, a detail of the motor and the geared connection for rotating the flexible shafts that drive the mechanism of the picker head.

The mechanism of the present invention is supported and carried upon a power driven truck 24, comprising a platform 25, front wheels 26 and rear wheels 27, although so far as the invention relating to the picker heads is concerned, this method of supporting the mechanism may be changed materially, and the same need not necessarily be carried upon a power driven truck.

As shown more clearly in Fig. 1, the picker heads 28 lie to the front of the vehicle. As is old and well known in the art, these picker heads are arranged across the front of the vehicle in series, comprising any number desired,—usually six to ten. The picker heads are grasped in the hands of the operator and are applied to the boll of the cotton plant. In the present invention these picker heads comprise a drum 29, which is affixed, as shown more clearly in Fig. 3, to a stub sleeve 30 secured to a gear 31 meshing with a gear 32. Thus, the drum 29 is revolved in unison with and by means of the rotation of the gear 31. The drum 30 is provided with a plurality of radially extending holes 33, which, as shown more clearly in Fig. 2, are placed at intervals on the body portion of the drum and one of said holes is provided for each of the picker teeth. The drum is surrounded by a casing 34, which has attached thereto a housing 35 for the gearing which drives the drum; and the walls of the casing are provided with inwardly extending circular flanges 36, which contact with the periphery of the outer ends of the drum with a relatively close fit, although, of course, not close enough to cause any friction therebetween and so interfere with the easy rotation of the drum. The function of the flanges 36 is to prevent cotton gathered by the teeth of the picker head from becoming wedged into the space between the drum and casing and so in time interfering with the easy rotation of the drum. The flange 36, as shown more clearly in Fig. 3, overlies the space between the outer faces of the drum and the face of the frame and so prevents the entrance of cotton thereinto.

Positioned in the interior of the drum is a shaft 37, which is offset at 38 to have its central portion 39 extend out of alinement with the ends 40, and, as shown more clearly in Fig. 3, the ends 40 are mounted within the walls of the casing 34. The ends 40 of this shaft 37 are fixed within the walls of the casing 34 so that the shaft is held against rotation with the rotation of the drum 29. Positioned upon the central portion 39 of the shaft 37 are a plurality of swinging brackets 41, shown more clearly in Fig. 2; and secured to the outer faces of these brackets are bars 42, in each of which bars are mounted a plurality of picker teeth 43. As will be seen in Fig. 3, the bars lie in a position so that they clear the lower edge of the ends 40 of the shaft 37. Hence, as they are rotated about this shaft, there is no interference with their movement by reason of their striking the ends of the shaft. The picker teeth, as shown more clearly in Fig. 2, project through the holes 33 in the drum 29, and are of a length so that they are never withdrawn from said openings during the actuation of the drum. As shown, the bars 42 extend substantially across the drum, but the brackets are somewhat shorter, so that the depending portions of the brackets can all be accommodated upon the shaft.

The operation of the picker head is as follows: When the drum 29 is rotated by the rotation of the gear 31, the walls of the holes 33 will engage the picker teeth and carry them along simultaneously with the drum, thus revolving the brackets 41 about the central portion 39 of the shaft 37. As shown in Figs. 2 and 3, the central portion 39 of the shaft 37 is located in advance of the axial center of the drum 29; hence, as the picker teeth are carried around through the medium of the rotation of the drum, their ends will be projected out from the drum and withdrawn in toward the drum as they advance to different positions. This is because of the placing of the axial center about which these teeth revolve off-center from the axial center about which the drum is revolved. Taking the parts as shown in Fig. 2, as the drum is rotated, the tooth marked $a$ will be carried from the position which it is shown into the position indicated by the next adjacent tooth $b$. The outer periphery of the drum, at the point $b$, will be farther removed from the axial center of the brackets 41 than the periphery of the drum at the point marked $a$, and, of course, the axial center of the brackets 41 is the center about which the teeth are revolved. Hence, since these teeth are held in fixed relation with respect to their axial center, it follows that as the periphery of the drum is drawn away or brought closer to the axial center of the teeth, the teeth will be drawn into or projected out a greater or less degree from the periphery of the drum.

The casing is of a configuration to provide a chamber 44, into which the cotton is placed when it is extracted from the picker teeth. As shown in Fig. 2, this chamber lies to the rear of the picker head; that is to say, it is positioned adjacent the point where the picker teeth are drawn farthest in to the drum. Hence, as the drum revolves, the picker teeth are projected outside of the periphery of the drum at a point opposite to the chamber 44, ar hen projected serve to gather cotton from ne boll of the plant. And as the drum farther revolves, it carries the teeth with the cotton thereon around until the teeth are withdrawn far enough into the body of the drum so that the periphery of the drum will engage the cotton and strip it from the teeth; and as such withdrawal of the teeth occurs at the point where the chamber 44 is located, the cotton will be stripped off at this point and placed in the chamber.

The gear 32 which, as shown more clearly in Fig. 4, drives the gear 31, is actuated by means of a flexible shaft 44ª, which is connected to a shaft 46 driven from a gear 47. The connection between the flexible shafts 44ª and 46 may consist, as more clearly shown in Fig. 5, of a disk 48 connected to the shaft 44ª and a disk 49 connected to the shaft 46; and interposed between these disks is a strip of fibrous substance 50. This forms a friction connection between the two shafts so that motion is imparted therethrough; but should the picker encounter any unusual obstacle, a slippage will be permitted between this connection, so that a bending of the teeth or a breaking of the drum will not occur.

Each of the picker heads, which are all similar to the one heretofore described, is provided with one of the flexible shafts 44ª; and each of these shafts is connected to a shaft 46 by the connection heretofore described. Each shaft 46 is provided with a gear 47 meshing with a gear 51 on a shaft 52, the shaft 52, as shown, being suitably supported by a bracket 53 extending from the casing of a motor 54, which acts as a common source of driving power for all the gears and shafts.

Located in the casing 58 is a suction fan secured to a shaft 63 which is driven by a pulley 64, from which extends a belt 65 driven from a main driving pulley 66. After the cotton has been stripped from the picker, it is carried up in the tube 57 by reason of the suction created by the fan. A pipe 74 leads from the casing 58, as shown in Fig. 1, and enters into a housing 75, which housing is supported by a frame-work 86 adapted to hold a receptacle 81, which receptacle is formed, as shown, of suitable mesh material 84.

I claim:

1. In a cotton picker, the combination of a drum, a fixed casing supporting said drum, a shaft mounted in said casing and extending through said drum, a portion of said shaft being offset, a series of brackets each provided with depending portions adapted to be mounted on the offset portion of said shaft, said depending portions of each bracket being spaced apart an equidistance, said depending portions being arranged side by side along the termini of the offset portion of the shaft, and a series of alined picker teeth secured to each bracket, said drum having holes through which said teeth project, substantially as described.

2. In a cotton picker, the combination of a drum, a fixed casing supporting said drum, a shaft mounted in said casing and extending through said drum, a portion of said shaft being offset, a series of brackets each provided with depending portions adapted to be mounted on the offset portion of said shaft, said depending portions of each bracket being spaced apart an equidistance, said depending portions being arranged side by side along the termini of the offset portion of the shaft, a bar secured to each bracket, each of said bars being of equi-length, a series of alined picker teeth secured to each bar, and said drum having holes through which said teeth project, substantially as described.

3. In a cotton picker, the combination of a drum, mechanism operatively connected for rotating said drum, a fixed casing supporting said drum, a shaft fixedly mounted in the walls of said casing and extending through and lying in the interior of said drum, the center of said shaft being off-center from the center of rotation of said drum, a series of members mounted upon said shaft to have independent rotation about said shaft, a bar secured to each member, a series of alined picker teeth rigidly secured to each bar, and said drum being provided with holes through which said teeth project, substantially as described.

4. In a cotton picker, the combination of a drum, mechanism operatively connected for rotating said drum, a fixed casing supporting said drum, a shaft fixedly mounted in the walls of said casing and extending through and lying in the interior of said drum, the center of said shaft being off-center from the center of rotation of said drum, a series of sets of picker teeth, each set comprising a plurality of teeth arranged longitudinally of the shaft, a member supporting each set of teeth, said member being rotatable on said shaft, the member supporting any one set of teeth being independently rotatable about said shaft with respect to the members supporting the remaining sets of teeth, and said drum being provided with holes through which said teeth project, substantially as described.

STEPHEN S. THOMAS.

Witnesses:
HARRY HODGES,
J. R. TINDELL.